United States Patent [19]

Lewis et al.

[11] Patent Number: 4,945,756

[45] Date of Patent: Aug. 7, 1990

[54] LEAKAGE DETECTION SYSTEM

[75] Inventors: Garnet Lewis, Temple Terrace, Fla.; John G. Crump, Barrington Hills, Ill.; Gregory P. Crump, West Caldwell, N.J.

[73] Assignee: Alert Technologies, Inc., Barrington Hills, Ill.

[21] Appl. No.: 391,152

[22] Filed: Aug. 8, 1989

[51] Int. Cl.$^5$ .............................................. G01M 3/26
[52] U.S. Cl. ...................................... 73/49.2; 73/309
[58] Field of Search ................. 73/49.2, 309, 296, 313

[56] References Cited

U.S. PATENT DOCUMENTS

| | | |
|---|---|---|
| 988,342 | 4/1911 | Hillmer . |
| 1,182,672 | 5/1916 | Frame . |
| 1,826,024 | 10/1931 | Roller . |
| 2,342,696 | 2/1944 | Rover ................................... 73/309 |
| 2,966,172 | 12/1960 | Smith .............................. 137/627.5 |
| 2,993,625 | 7/1961 | Esval ................................... 222/55 |
| 3,153,931 | 10/1964 | Klemmetsen .......................... 73/299 |
| 3,269,184 | 8/1966 | O'Connor ............................. 73/309 |
| 3,527,096 | 9/1970 | Cohn et al. .......................... 73/309 |
| 3,788,356 | 7/1972 | Goodwin ............................. 177/190 |
| 4,013,194 | 3/1977 | Moscarini ............................. 222/23 |
| 4,039,036 | 8/1977 | Baumgartner et al. ............. 177/212 |
| 4,095,463 | 6/1978 | Wohrl ................................ 73/141 R |
| 4,244,218 | 1/1981 | Wohrl ................................... 73/309 |
| 4,300,388 | 11/1981 | Hansel et al. ........................ 73/49.2 |
| 4,368,640 | 1/1983 | Tokarz ................................... 73/311 |
| 4,387,778 | 6/1983 | Wohrl ................................. 177/207 |
| 4,453,400 | 6/1984 | Senese et al. ........................ 73/49.2 |
| 4,483,192 | 11/1984 | Wachter ................................ 73/311 |
| 4,604,893 | 8/1986 | Senese et al. ........................ 73/49.2 |
| 4,630,467 | 12/1986 | Senese et al. ........................ 73/49.2 |
| 4,646,560 | 3/1987 | Maresca, Jr. et al. ............... 73/49.2 |
| 4,796,469 | 1/1989 | Brown et al. ........................ 73/49.2 |

FOREIGN PATENT DOCUMENTS

| | | | |
|---|---|---|---|
| 250077 | 9/1960 | Australia ............................... 73/309 |
| 2235808 | 2/1974 | Fed. Rep. of Germany . | |
| 872279 | 2/1942 | France ................................ 73/309 |
| 276474 | 10/1970 | U.S.S.R. .............................. 73/49.2 |

Primary Examiner—John Chapman
Assistant Examiner—Joseph W. Roskos
Attorney, Agent, or Firm—Fitch, Even, Tabin & Flannery

[57] ABSTRACT

Apparatus for detection leakage of hydrocarbon-containing liquid, such as gasoline, from a generally cylindrical tank. The apparatus includes an elongate displacer having a vertical axis and extending substantially the full height of the liquid in the tank. The displacer has an upper end and a lower end with the displacer lower end terminating closely adjacent but spaced from the bottom of the tank. The displacer is made of a material having a coefficient of linear expansion of less than $20 \times 10^{-6}$ inches per inch per degree centigrade. Furthermore, the displacer is substantially symmetrical about about any plane through its vertical axis and it has an outer surface which is a surface of revolution. The displacer has a varying diameter along its length corresponding to the horizontal surface area of the tank at the same height inside of the tank. The apparatus further includes a sensor for providing an indication of the weight of the displacer disposed in the liquid. The apparatus also includes a cable extending inside a upwardly extending pipe joining the tank and connecting the upper end of the displacer to the sensor.

12 Claims, 2 Drawing Sheets

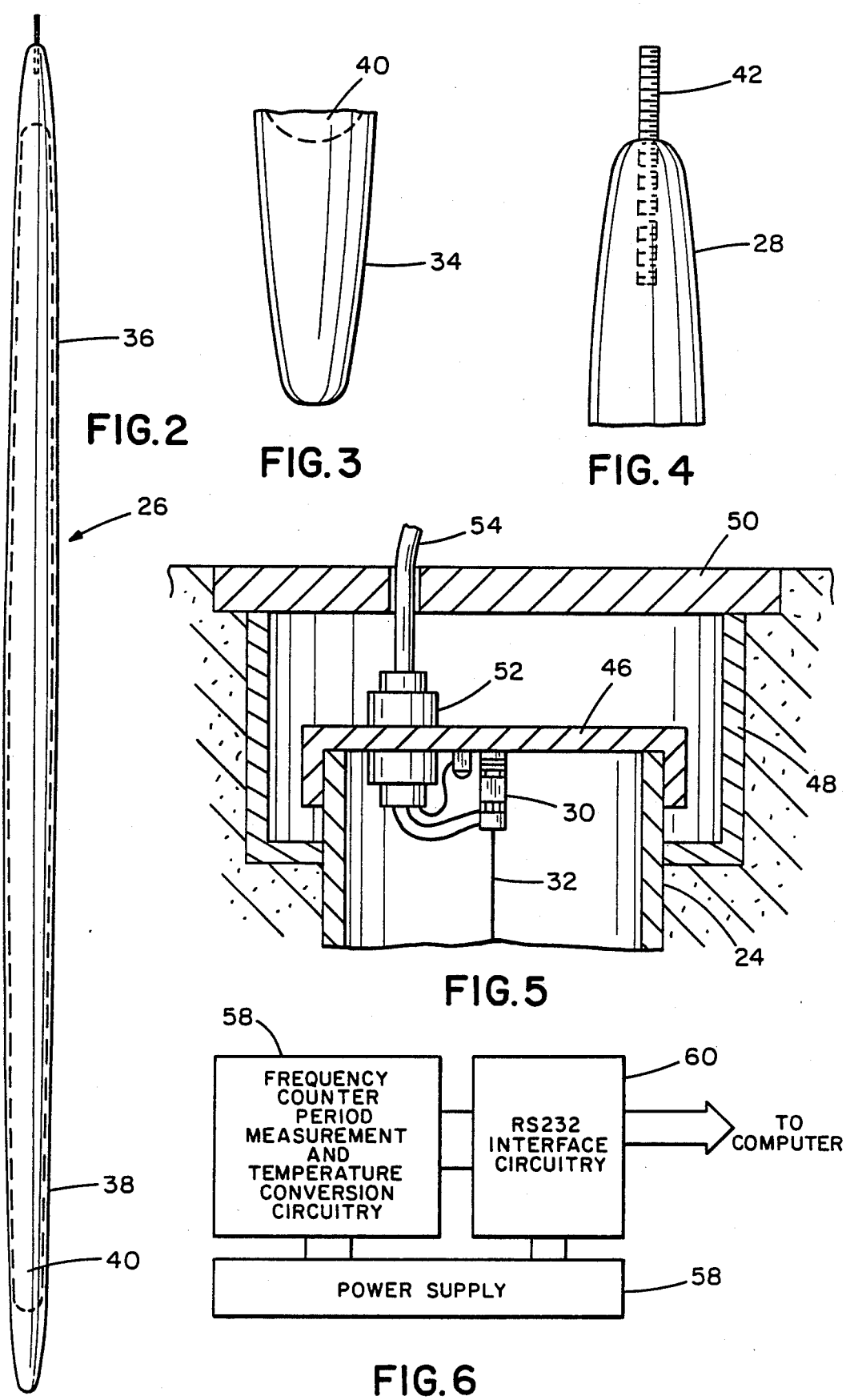

LEAKAGE DETECTION SYSTEM

This invention relates to leakage detection systems and, more specifically, to a system for detecting the leakage of chemical or hydrocarbon bearing liquids from underground storage tanks.

BACKGROUND OF THE INVENTION

Environmental Protection Agency (EPA) regulations now require leak detection equipment for underground storage tanks containing hydrocarbon-bearing liquid such as fuel oil, heating oil and gasoline. The EPA estimates that there are about two million tanks at 750,000 locations in the United States, and that up to one-fifth of those tanks are leaking.

A main problem with any leakage detection system is to compensate for changes in the volume of the stored liquid due to temperature changes. Because hydrocarbon-bearing fluids have a relatively high coefficient of expansion, a decrease in temperature can result in a significant decrease in the volume of liquid in the tank, without any leakage. Of course, without compensating for this change, it is not possible to distinguish a leak from a level change caused by a temperature change.

Various equipment has been proposed for measuring the fluid in a tank and for detecting leakage. For example, U.S. Pat. Nos. 4,244,218 and 4,387,778 to Wohrl are directed to fluid measuring devices including a plunger connected to a load cell and extending into the liquid in the tank. However, the equipment discussed in these patents requires extensive calibration. U.S. Pat. No. 3,677,356 to Goodwin also is directed to the weighing of liquids and includes a body submerged in the liquid to be measured. This body is supported by one end of a balance beam.

U.S. Pat. No. 4,300,388 to Hansel et al. shows leakage measurement equipment including a sensor extending into the liquid and supported by a balance. The sensor includes a cup portion for compensating for evaporation of the hydrocarbon in the tank. The sensor is filled with liquid and careful calibration is required.

U.S. Pat. Nos. 4,453,400; 4,604,893 and 4,630,467 to Senese et al. are all directed to a leak detector and method of use in which light from a bulb is directed at a photoresistor. While the bulb and photoresistor are held fixed, the photoresistor is submerged in a cup of India ink solution held at the top of a float. Minute vertical movement of the float is sensed by the photoresistor because the level of the solution covering the photoresistor varies in accordance with the float position.

SUMMARY OF THE INVENTION

Among the several aspects and features of the present invention may be noted the provision of an improved leak detection system for a generally cylindrical underground storage tank for hydrocarbon containing liquids. The system includes a specifically shaped displacer having a cross-sectional configuration varying along its vertical length in mathematical relationship to the corresponding transverse surface area of the tank at the same height. Furthermore, the displacer is manufactured of a material having a very low coefficient of thermal expansion. The system compensates for changes in volume in the tank due to temperature variation, while detecting very small changes in the mass of liquid in the tank to indicate leakage. The leakage detection system of the present invention is reliable in use, has longer service life and is relatively easy and economical to manufacture. Other aspects and features of the present invention will be, in part, apparent and, in part, pointed out hereinafter in the following specification and accompanying drawings.

BRIEF DESCRIPTION OF THE DRAWINGS

FIG. 2 is an enlarged front elevational view of the displacer of FIG. 1;

FIG. 3 is an enlarged front elevational view of the lower end of the displacer, while FIG. 4 is a similar view of the upper end of the displacer;

FIG. 5 is a front elevational view showing a load cell and a support cable or the like for connecting the displacer to the load cell; and FIG. 6 is a block diagram showing circuitry for conditioning the output signal of the load cell for reception by a computer.

Corresponding reference characters indicate corresponding components throughout the several views of the drawings.

DESCRIPTION OF THE PREFERRED EMBODIMENT

Figure 1:
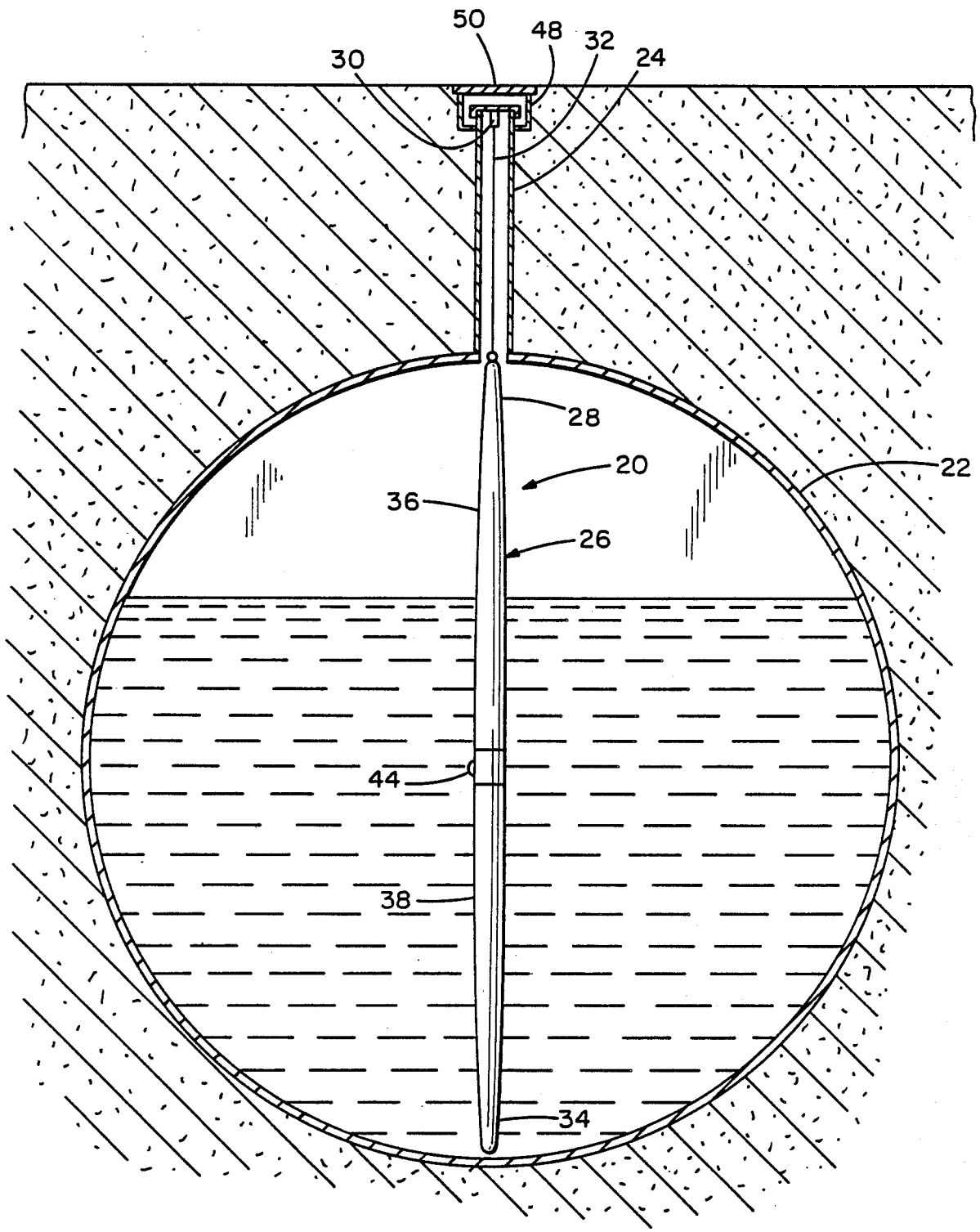
FIG. 1 is a front elevational view of leak detection apparatus embodying various aspects of the present invention, including a displacer hanging pendant into a tank of liquid.

Referring now the the drawings, apparatus for detecting leakage of liquid from a tank holding hydrocarbon-containing liquid, such as gasoline or heating oil, is generally indicated by reference numeral 0 in FIG. 1. The tank 22 could be, for example, an underground gasoline storage tank which is generally cylindrical and includes a centrally located pipe 24 extending upwardly from the main tank and communicates with the interior of the tank. A common gasoline storage tank has an interior diameter of eight feet. The apparatus 20 includes an elongate displacer 26 having a vertical axis and extending substantially the full height of the liquid in the tank. As best shown in FIG. 5, the upper end 28 of the displacer is attached to a load cell 30, supported near the top of the pipe 24, by suspension means, preferably in the form of a cable 32. The bottom end 34 of the displacer in position slightly above the bottom of the tank. For the exemplary tank having an inside diameter of eight feet, the bottom end 34 could be spaced from the bottom about ¼ inch.

According to Archimedes' principle, a body immersed in static fluid is acted upon by a vertical force equal to the weight of the fluid dispersed. Because the weight of the displacer 26 is greater than or equal to the weight of the fluid displaced, the load cell 30 will provide an output corresponding to the weight of the displacer less the weight of the fluid displaced. Assume that the temperature of the fluid in the tank was constant without regard to tank level (no thermal stratification). Further assume that the temperature of the fluid remained constant. With these assumptions, a change in the output of the load cell would indicate a change in the liquid level of the tank. More specifically, if no liquid was being pumped out of the tank, a change in the load cell output would indicate that the tank was leaking.

Neither of these assumptions is valid in a practical application. There is both thermal stratification in the liquid and the ambient temperature can have wide swings, particularly during a 24 hour period. Furthermore, hydrocarbon-containing liquid has a very high thermal coefficient of expansion. For example, the coefficient of expansion for gasoline is 0.006 per degree Centigrade. With respect to the exemplary eight foot diameter tank, holding 10,000 gallons, a one degree temperature increase corresponds to an increase of about six gallons. Therefore with a conventional displacer, a change in the load cell output could indicate that the liquid level is changing either due to temperature change or due to leakage.

The displacer 26 of the present invention is formed of material having a low coefficient of expansion, less than $20 \times 10^{-6}$ per degree Centigrade. Additionally, the cross-sectional area of the displacer is directly proportional to the transverse cross-sectional area of the tank at any point along the length of the probe. The result is that the output of the load cell relates to the mass of the contained fluid, not to its volume. While an increase in temperature causes a volumetric increase, assuming no leakage, the density decreases and the mass of the fluid is constant. As the output of the load cell relates to a change in mass, it can be used to signal leakage of the fluid.

More specifically, the displacer 26 is preferably formed of glass, such as Pyrex which has a coefficient of linear expansion (per degree Centigrade) of $3.2 \times 10^{-6}$, quartz which has a coefficient of thermal expansion of $0.45 \times 10^{-6}$, or porcelain which has a coefficient of thermal expansion of between 3 and $4 \times 10^{-6}$. The displacer can be formed of upper and lower shell halves, 36 and 38, respectively. At least the lower half 38 has a cavity 40. For the exemplary eight foot displacer, the wall thickness of the half or halves defining the cavity is preferably between about 0.050" to 0.150". The exemplary displacer preferably has a weight of about 19.5 pounds. The Weight shortfall between the displacer shell and the desired weight can be addressed by adding ballast, such as steel or lead shot, in the cavity in the lower displacer half 38, before the halves are joined to complete the displacer. Preferably, a threaded rod 42 or the like extends from the top of the upper displacer half to facilitate connection of the displacer to the cable 32.

The cylindrical tank 22 also typically is formed of material having a relatively low coefficient of thermal expansion compared to those of hydrocarbon-bearing liquids. Such tanks are usually formed of steel ($26 \times 10^{-6}$) or aluminum ($23 \times 10^{-6}$). The displacer material must have a smaller coefficient of thermal expansion than the tank material because there are factors present which constrain expansion of the tank which are not present with respect to the displacer. First, the earth surrounding the underground tank acts as a heat sink. Second, the earth backfilled about the tank works to mechanically constrain its expansion. That is, the change in shape of the displacer 26 due to a temperature change should mirror the change in shape of the tank 22 due to that temperature change. If the tank, like the displacer, was not constrained from its natural contraction or expansion due to a temperature change, both the tank and the displacer could be formed of the same material. However, because the tank is substantially constrained and the displacer is substantially free (unconstrained by its environment) to change shape in accordance with the temperature change, it is necessary that the displacer be made of a material having a smaller coefficient of thermal expansion so that the displacer change faithfully corresponds to the tank change.

The pipe 24 and the cable 32 should be formed of material having substantially the same coefficient of thermal expansion. This is necessary because if the cable did not change in concert with the expansion or contraction of the pipe with a change in temperature, the load cell 30 would experienced a force change that is not related to a change in the mass of the stored liquid. By selecting materials for the pipe and cable of substantially identical thermal coefficients of expansion (within one percent), such as by using steel for each, compensation is provided for expansion or contraction of the pipe as a result of a temperature change.

The mathematical relationship between the diameter of the displacer 26 with respect to the height inside the exemplary eight foot diameter cylindrical tank is expressed by the following formula:

$$d = 2 \sqrt{\frac{(.2004402)(\sqrt{mh - h^2})}{\pi}} \tag{1}$$

where:
 d = diameter of the displacer;
 m = maximum internal height of tank;
 h = distance from tank bottom.

For the exemplary eight foot inside diameter tank, the maximum displacer diameter is located 48 inches from the tank bottom and exemplary maximum diameter could be chosen to be 3.5 inches.

The above formula for the exemplary eight foot diameter tank is derived after taking into account that the ratio of the cross-sectional area of the displacer 26 to the cross-sectional area of the tank 22 should be constant at any height in the tank, except at the bottom of the displacer where there is a small gap so that the displacer does not rest on the tank. Because the tank is a right circular cylinder, the length of the tank is constant. The length of the horizontal chord (c) taken at a given distance from the tank bottom is expressed by:

$$c = 2\sqrt{R^2 - (R - h)^2} = 2\sqrt{2Rh - h^2} \tag{2}$$

where: R = tank radius. Substituting D (tank diameter) = 2R $$c = \sqrt{Dh - h^2} \tag{3}$$

Because:
 (A) the ratio of displacer cross-sectional area to chord length (c) is a constant; and
 (B) the area of the displacer at mid tank level is $(d_{max}/2)^2\pi$, where $d_{max}$ is the displacer diameter at mid tank level, then $$\frac{(d_{max}/2)^2\pi}{D} = \text{constant} \tag{4}$$

The area of the displacer at a particular height inside the tank equals:

$$\left(\frac{d_{max}^2/2\pi}{D}\right)(c) = 2\sqrt{Dh - h^2}\left(\frac{(d_{max}/2)^2 \pi}{D}\right) \quad (5)$$

The diameter of the displacer at a particular height inside the tank equals:

$$2\sqrt{\frac{\frac{(d_{max}/2)^2 \pi}{D} * 2\sqrt{Dh - h^2}}{\pi}} \quad (6)$$

For the exemplary case of a 96 inch diameter tank with a maximum displacer diameter of 3.5 inches, the diameter of the displacer as a function of tank height expressed by:

$$2\sqrt{\frac{(.2004402)(\sqrt{96h - h^2})}{\pi}} \quad (7)$$

A temperature sensor 44 is located on the outer surface of the displacer at about its midpoint. The sensor is preferably covered by a protective outer sheath and could be a resistive temperature element, such as a thermocouple. Leads (not shown) from the sensor can be connected to the same support 46 which holds the load cell 30. Support 46 could be in the form of a cap at the top of pipe 24. The upper end of the pipe and the cap are preferably disposed in an entrance housing 48 having a cover 50 at ground level. A cable connector 52 is attached to the support 46 and an electrical cable 54, which carries the load cell and sensor outputs, passes through the cover 50 for conveying the signals to circuitry, shown in block diagram form in FIG. 6, which may be located remote from tank 22.

While the sensor 44 output does not play a role in determining the presence of a leak, it is of use for volumetric conversion. As discussed above, the output of the load cell represents the mass of the contained liquid. By factoring in the average temperature of the liquid, the mass can be converted to a measurement of the tank contents in terms of gallons. This is useful for inventory assessment and control.

The load cell 30 has a resolution of at least 100,000 to 1 and preferably has a resolution of 1,000,000 to 1. Such resolution is easily achieved with quartz crystal technology. The circuitry shown in FIG. 6 may be conventional. Suffice it to say that it includes a power supply 56 for conversion circuitry 58 which measures the outputs of the load cell 30 and sensor 44 and converts them to proper inputs, through interface circuitry 60, to a computer (not shown). The computer can be programmed to, among other things, provide instantaneous readings of leakage (gallons/hour) and total gallons in the tank. It can also be programmed to indicate an alarm condition should leakage exceed a predetermined value.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for detecting leakage of liquid from a generally cylindrical tank which is substantially symmetrical about a horizontal axis, said tank holding a chemical or hydrocarbon-containing liquid such as gasoline or heating oil and including a pipe extending upwardly and communicating with the interior of said tank, said apparatus comprising:

an elongate displacer having a vertical axis and extending substantially the full height of the liquid in said tank and having an upper end and a lower end, the displacer lower end terminating closely adjacent but spaced from the bottom of said tank, said displacer being made of a material having a coefficient of linear expansion of less than $20 \times 10^{-6}$ per degree Centigrade, said displacer being substantially symmetrical about any plane through said vertical axis and having an outer surface which is a surface of revolution, the displacer having a varying diameter along its length corresponding to the horizontal surface area of the tank at the same height inside said tank, said displacer having its greatest diameter at its midpoint and its smallest diameter at said ends;

indicating means for providing an indication of the weight of said displacer disposed in said liquid; and suspension means extending inside said pipe and connecting the upper end of said displacer to said indicating means.

2. Apparatus as set forth in claim 1 wherein said indicating means comprises a load cell providing an output frequency related to the force exerted on said load cell by said displacer, said load cell having a minimum resolution of 100,000 to 1.

3. Apparatus as set forth in claim 1 wherein said displacer is formed of glass.

4. Apparatus as set forth in claim 1 wherein said displacer is formed of porcelain.

5. Apparatus as set forth in claim 1 wherein said displacer is formed of quartz.

6. Apparatus as set forth in claim 1 wherein said displacer has an internal cavity receiving ballast.

7. Apparatus as set forth in claim 1 wherein said pipe and said suspension means are formed of materials having coefficients of linear expansion within one percent of each other.

8. Apparatus for detecting leakage of liquid from a generally cylindrical tank which is substantially symmetrical about a horizontal axis, said tank holding a chemical or hydrocarbon-containing liquid such as gasoline or heating oil and including a pipe extending upwardly and communicating with the interior of said tank, said apparatus comprising:

an elongate displacer having a vertical axis and extending substantially the full height of the liquid in said tank and having an upper end and a lower end, the displacer lower end terminating closely adjacent but spaced from the bottom of said tank, said displacer being made of a material having a coefficient of linear expansion of less than $2 \times 10^{-6}$ per degree Centigrade, said displacer being substantially symmetrical about any plane through said vertical axis and having an outer surface which is a surface of revolution, the displacer having a varying diameter along its length corresponding to the horizontal surface area of the tank at the same height inside said tank;

indicating means for providing an indication of the weight of said displacer disposed in said liquid; and
suspension means extending inside said pipe and connecting the upper end of said displacer to said indicating means, said dispenser varying in diameter along the height in the tank substantially in accordance with the following formula:

$$d = 2\sqrt{\dfrac{\dfrac{(d_{max}/2)^2\pi}{D} \cdot 2\sqrt{Dh - h^2}}{\pi}}$$

where:
d = diameter of said displacer;
$d_{max}$ = selected maximum diameter of said displacer;
D = diameter of tank (maximum height of tank);
h = height from bottom of tank.

9. Apparatus for detecting leakage of liquid from a generally cylindrical tank which is substantially symmetrical about a horizontal axis, said tank holding a chemical or hydrocarbon-containing liquid such as gasoline or heating oil and including a pipe extending upwardly and communicating with the interior of said tank, said apparatus comprising:
an elongate displacer having a vertical axis and extending substantially the full height of the liquid in said tank and having an upper end and a lower end, the displacer lower end terminating closely adjacent but spaced from the bottom of said tank, said displacer being made of a material having a coefficient of linear expansion of less than $2 \times 10^{-6}$ per degree Centigrade, said displacer being substantially symmetrical about any plane through said vertical axis and having an outer surface which is a surface of revolution, the displacer having a varying diameter along its length corresponding to the horizontal surface area of the tank at the same height inside said tank;
indicating means for providing an indication of the weight of said displacer disposed in said liquid; and
suspension means extending inside said pipe and connecting the upper end of said displacer to said indicating means, said apparatus further comprising a sensor for use in measuring the temperature of said liquid, said sensor being positioned adjacent the midpoint of said displacer.

10. Apparatus for detecting leakage of liquid from a generally cylindrical tank which is substantially symmetrical about a horizontal axis, said tank holding a chemical or hydrocarbon-containing liquid such as gasoline or heating oil and including a pipe extending upwardly and communicating with the interior of said tank, said apparatus comprising:
an elongate displacer having a vertical axis and extending substantially the full height of the liquid in said tank and having an upper end and a lower end, the displacer lower end terminating closely adjacent but spaced from the bottom of said tank, said displacer being made of a material having a coefficient of linear expansion of less than $20 \times 10^{-6}$ per degree Centigrade, said displacer being substantially symmetrical about any plane through said vertical axis and having an outer surface which is a surface of revolution, the displacer having a varying diameter along its length corresponding to the horizontal surface area of the tank at the same height inside said tank;
indicating means for providing an indication of the weight of said displacer disposed in said liquid; and
suspension means extending inside said pipe and connecting the upper end of said displacer to said indicating means, said apparatus further comprising a temperature sensor carried by said displacer and disposed adjacent the midpoint of said displacer.

11. Apparatus for detecting leakage of liquid from a generally cylindrical tank which is substantially symmetrical about a horizontal axis, said tank holding a chemical or hydrocarbon-containing liquid such as gasoline or heating oil and including a pipe extending upwardly and communicating with the interior of said tank, said apparatus comprising:
an elongate displacer having a vertical axis and extending substantially the full height of the liquid in said tank and having an upper end and a lower end, the displacer lower end terminating closely adjacent but spaced from the bottom of said tank, said displacer being made of a material having a coefficient of linear expansion of less than $20 \times 10^{-6}$ per degree Centigrade, said displacer being substantially symmetrical about any plane through said vertical axis and having an outer surface which is a surface of revolution, the displacer having a varying diameter along its length corresponding to the horizontal surface area of the tank at the same height inside said tank, said displacer having its greatest horizontal cross-sectional area adjacent its midpoint and its smallest diameter at said ends so that the weight of the displacer corresponds to the mass of the liquid in said tank;
a load cell supported adjacent said pipe for providing an indication of the weight of said displacer disposed in said liquid; and
suspension means extending inside said pipe and connecting the upper end of said displacer to said load cell.

12. Apparatus for detecting leakage of liquid from a generally cylindrical tank which is substantially symmetrical about a horizontal axis, said tank holding a chemical or hydrocarbon-containing liquid such as gasoline or heating oil and including a pipe extending upwardly and communicating with the interior of said tank, said apparatus comprising:
an elongate displacer having a vertical axis and extending substantially the full height of the liquid in said tank and having an upper end and a lower end, the displacer lower end terminating closely adjacent but spaced from the bottom of said tank, said displacer being made of a material having a coefficient of linear expansion of less than $20 \times 10^{-6}$ per degree Centigrade, said displacer being substantially symmetrical about any plane through said vertical axis and having an outer surface which is a surface of revolution, said displacer having a configuration so that its weight corresponds to the mass of the liquid in said tank;
a load cell supported adjacent the top of said pipe providing an indication of the weight of said displacer disposed in said liquid;
suspension means extending inside said pipe and connecting the upper end of said displacer to said load cell and
a temperature sensor carried by said displacer and disposed adjacent the midpoint of said displacer whereby the output of said load cell corresponds to the mass of said liquid and the output of said sensor can be used to indicate the volume of liquid in said tank.

* * * * *

UNITED STATES PATENT AND TRADEMARK OFFICE
CERTIFICATE OF CORRECTION

PATENT NO. : 4,945,756

DATED : August 7, 1990

INVENTOR(S) : Garnet Lewis et al.

It is certified that error appears in the above-identified patent and that said Letters Patent is hereby corrected as shown below:

On the title page:

In the Abstract, line 12, delete second occurrence "about".

In the Abstract, line 19, change "a" (2nd occurrence) to --an--.

Column 2, line 2, change "longer" to --long--.

Column 2, line 30, change "the" (first occurrence) to --to--.

Column 2, line 33, change "0" to --20--.

Column 2, line 46, replace "in position" with --is positioned---.

Column 3, line 37, change "Weight" to --weight--.

Column 4, line 8, change "experienced" to --experience--.

UNITED STATES PATENT AND TRADEMARK OFFICE
CERTIFICATE OF CORRECTION

PATENT NO. : 4,945,756

DATED : August 7, 1990

INVENTOR(S) : Garnet Lewis et al.

It is certified that error appears in the above-identified patent and that said Letters Patent is hereby corrected as shown below:

Column 4, line 53, change "$C = \sqrt{Dh - h^2}$" to --$C = 2\sqrt{Dh - h^2}$--.

Column 6, line 62, change "2" to --20--.

Column 7, line 5, change "dispenser" to --displacer--.

Column 7, line 32, change "2" to --20--.

Column 8, line 64, after "cell" insert a semicolon.

Signed and Sealed this

Fourteenth Day of July, 1992

*Attest:*

DOUGLAS B. COMER

*Attesting Officer*       *Acting Commissioner of Patents and Trademarks*